United States Patent [19]

Halbert et al.

[11] Patent Number: 4,839,326

[45] Date of Patent: Jun. 13, 1989

[54] PROMOTED MOLYBDENUM AND TUNGSTEN SULFIDE CATALYSTS, THEIR PREPARATION AND USE

[75] Inventors: Thomas R. Halbert, Annandale; Edward I. Stiefel, Bridgewater; Russell R. Chianelli, Somerville; Teh C. Ho, Bridgewater, all of N.J.

[73] Assignee: Exxon Research and Engineering Company, Florham Park, N.J.

[21] Appl. No.: 725,662

[22] Filed: Apr. 22, 1985

[51] Int. Cl.$^4$ ............................................. B01J 27/047
[52] U.S. Cl. ..................................... 502/220; 502/168; 502/219; 502/221
[58] Field of Search ............... 208/215; 502/168, 219, 502/220, 221, 222, 314, 315, 316, 321, 322, 335, 338

[56] References Cited

U.S. PATENT DOCUMENTS

| | | | |
|---|---|---|---|
| 2,715,603 | 8/1955 | Lanning et al. | 196/53 |
| 2,891,003 | 6/1959 | Chervenak et al. | 208/216 |
| 2,914,462 | 12/1963 | Hemminger | 208/112 |
| 3,074,783 | 1/1963 | Paull | 23/212 |
| 3,116,234 | 12/1963 | Douwes et al. | 208/208 |
| 3,148,135 | 9/1964 | Schlinger et al. | 208/58 |
| 3,165,463 | 1/1965 | Gleim et al. | 208/264 |
| 3,245,903 | 4/1966 | Champagnat | 208/264 |
| 3,249,556 | 5/1966 | Gatsis | 252/415 |
| 3,262,874 | 7/1966 | Gatsis | 208/216 |
| 3,265,615 | 8/1966 | Buss | 208/254 |
| 3,269,958 | 8/1966 | Gatsis | 252/439 |
| 3,271,302 | 9/1966 | Gleim | 208/264 |
| 3,331,769 | 3/1965 | Gatsis et al. | 208/210 |
| 3,459,656 | 8/1969 | Rausch | 208/57 |
| 3,893,947 | 7/1975 | Young | 502/220 |
| 4,108,761 | 8/1978 | Sze et al. | 208/254 |
| 4,171,258 | 10/1979 | Gaspar | 208/144 |
| 4,368,115 | 1/1983 | Chianelli et al. | 208/215 |
| 4,430,442 | 2/1984 | Sawyer et al. | 502/222 |
| 4,430,443 | 2/1984 | Seiver et al. | 502/222 |
| 4,455,218 | 6/1984 | Dymock et al. | 208/50 |
| 4,504,589 | 3/1985 | Ryan | 502/314 |
| 4,508,847 | 4/1985 | Chianelli et al. | 502/222 |
| 4,510,260 | 4/1985 | Stiefel et al. | 502/221 |
| 4,513,098 | 4/1985 | Tsao | 502/220 |
| 4,514,517 | 4/1985 | Ho et al. | 502/221 |
| 4,581,125 | 4/1986 | Stiefel et al. | 208/108 |

OTHER PUBLICATIONS

Burmistov et al., Catalytic Properties of Ni/WS$_2$ Samples in Thiophene Hydrogenalysis, React. Kinet. Catal. Lett., 24, pp. 365–369 (1984).

Zaikovskii, TEM and XPS Studies of Ni/WS$_2$ Catalysts for Thiophene Hydrogenalysis, React. Kinet. Catal. Lett., 24, pp. 17–22.

Primary Examiner—Anthony McFarlane
Attorney, Agent, or Firm—E. Thomas Wheelock; Joseph J. Dvorak

[57] ABSTRACT

This invention relates to a process for the preparation of promoted molybdenum and tungsten sulfide catalysts, the catalysts prepared by such process, and to the use of such catalysts for hydroprocessing processes, particularly hydrotreating. More particularly, this invention relates to the preparation and use of promoted catalysts useful for hydroprocessing processes such as hydrotreating wherein said catalysts are formed by treating molybdenum and tungsten sulfide-containing material (which may be supported) with a low valence promoter metal selected from transition metals particularly the group of Fe, Co, Ni.

29 Claims, No Drawings

PROMOTED MOLYBDENUM AND TUNGSTEN SULFIDE CATALYSTS, THEIR PREPARATION AND USE

FIELD OF THE INVENTION

This invention relates to a process for the preparation of promoted molybdenum and tungsten sulfide catalysts, the catalysts prepared by such process and their predecessors and to the use of such catalysts for hydroprocessing, particularly hydrotreating. More particularly, this invention relates to the preparation and use of promoted catalysts useful for hydroprocessing processes such as hydrotreating wherein said catalysts are formed by treating molybdenum sulfide- or tungsten sulfide-containing materials (which may be supported) with an organometallic complex containing a transition metal promoter. The most preferred transition metals are selected from the group of Co, Fe and Ni.

BACKGROUND OF THE INVENTION

The petroleum industry is increasingly turning to coal, tar sands, heavy crudes and distilled residual oils as sources for feedstocks. Feedstocks derived from these heavy materials often contain more sulfur and nitrogen than feedstocks derived from more conventional crude oils and are commonly referred to as being dirty feeds. These feeds require a considerable amount of upgrading before being introduced into processes which make lighter products such as fuel oil or gasoline. Such upgrading or refining generally is accomplished by the hydrotreating processes which are well-known in the petroleum industry.

Hydrotreating processes may require the step of treating the hydrocarbon with hydrogen or a catalytic material to convert at least a portion of the feedstocks to lower molecular weight hydrocarbons, or to remove unwanted components, or compounds, or to convert them into innocuous or less undesirable compounds. Hydrotreating may be applied to a variety of feedstocks, e.g., solvents, light, middle, or heavy distillate feeds and residual feeds, or fuels. In hydrorefining relatively light feeds, the feeds are treated with hydrogen, often to improve odor, color, stability, combustion characteristics, and the like. Unsaturated hydrocarbons are often hydrogenated to saturation. Sulfur and nitrogen are occasionally removed as part of such treatments. In the treatment of catalytic cracking feedstocks, the cracking quality of the feedstock is generally improved by the hydrotreating in that elemental carbon yield is reduced and gasoline yield is increased. In the hydrodesulfurization ("HDS") of heavier feedstocks, or residua, the sulfur compounds are hydrogenated and cracked. Carbon-sulfur bonds are broken, and the sulfur, for the most part, is converted to hydrogen sulfide which is removed as a gas from the process. Hydrodenitrogenation ("HDN"), to some degree, also accompanies hydrodesulfurization reactions. In the hydrodesulfurization of relatively heavy feedstocks, emphasis is on the removal of sulfur from the feedstock.

Catalysts most commonly used for hydrotreating reactions include materials such as cobalt molybdate on alumina, nickel on alumina, colbalt molybdate promoted with nickel, nickel tungstate, etc. Molybdenum sulfide is also used to upgrade oils containing sulfur and nitrogen compounds by catalytically removing such compounds in the presence of hydrogen, which processes are collectively known as hydrotreating or hydrorefining processes, it being understood that hydrorefining also includes some hydrogenation of aromatic and unsaturated aliphatic hydrocarbons. Thus, U.S. Pat. No. 2,914,462 discloses the use of molybdenum sulfide for hydrodesulfurizing gas oil and U.S. Pat. No. 3,148,135 discloses the use of molybdenum sulfide for hydrorefining sulfur and nitrogen-containing hydrocarbon oils. U.S. Pat. No. 2,715,603 discloses the use of molybdenum sulfide as a catalyst for the hydrogenation of heavy oils, while U.S. Pat. No. 3,074,783 discloses the use of molybdenum sulfides for producing sulfur-free hydrogen and carbon dioxide, wherein the molybdenum sulfide converts carbonyl sulfide to hydrogen sulfide. Molybdenum sulfide has other uses in catalysis, including hydrogenation, methanation, water gas shift, etc., reactions.

Catalysts comprising molybdenum sulfide in combination with other metal sulfides are also known. Thus, U.S. Pat. No. 2,891,003 discloses an iron-chromium combination for desulfurizing olefinic gasoline fractions; 3,116,234 discloses Cr-Mo and also Mo with Fe and/or Cr and/or Ni for HDS; 3,265,615 discloses Cr-Mo for HDN and HDS; 3,245,903 discloses Fe-Mo and Fe-Co-Mo for lube oil refining; 3,459,656 discloses Ni-Co-Mo for HDS; 4,108,761 discloses Fe-Ni-Mo for HDN and 4,171,258 discloses Fe-Cr-Mo for HDS with steam.

Additionally, Gleim et al, U.S. Pat. No. 3,165,463 and Gatsis '958, U.S. Pat. No. 3,269,958, suggest the use of a non-supported Group VIB, VB or iron group metal as a hydroprocessing catalyst. The catalyst is made by admixing a hydrocarbon feedstock with an organo-metallic compound and decomposing the compound to form a colloidal suspension which is then sulfided. Examples 11 and 111 therein appear to show mixed Mo and Ni catalysts. Gatsis '556, U.S. Pat. No. 3,249,556, suggests a similar process. The Group VIB, VB or iron group metal, in organometallic form, is mixed with a hydrocarbon feedstock, and the resulting colloidal suspension is reacted with hydrogen. The resulting reaction mixture is separated to provide a catalyst containing sludge which, in turn, is hydrogenated in the presence of an iodine-containing compound to form a catalyst suitable for recycle to the feedstock hydrocarbon.

Gatsis '874, U.S. Pat. No. 3,262,874, suggests a variation of the above-noted processes in which the catalyst is the decomposition product of a mixture of a heteropoly acid and nickelous sulfate.

Gleim '302, U.S. Pat. No. 3,271,302, and Gatis '769, U.S. Pat. No. 3,331,769, suggest a variation in which one or more of the noted materials is placed on an inorganic support.

The use of nickel to promote various sulfide catalysts has been reported. See, Burmistov et al, Catalytic Properties of Ni/WS$_2$ Samples in Thiophene Hydrogenalysis, React. Kinet. Catal. Lett., 24, pp. 365–369 (1984) and Zaikovskii, TEM and XPS Studies of Ni/WS$_2$ Catalysts for Thiophene Hydrogenalysis, React. Kinet. Catal. Leit., 24, pp. 17–22.

None of the above-cited prior art discloses a molybdenum or tungsten sulfide catalyst suitable for hydroprocessing in which the molybdenum or tungsten sulfide is promoted by use of low-valent transition metal compounds.

SUMMARY OF THE INVENTION

The present invention relates to catalysts suitable for use in hydrotreating processes. The catalysts are made by promoting a molybdenum or tungsten sulfide-containing composition with a low valent organometallic composition in which the metal is a transition metal and is preferably Fe, Co, or Ni and most preferably Co. The valency of the metal is either 0 or +1. The molybdenum or tungsten sulfide may be, alternatively, supported on an inert carrier such as $Al_2O_3$, $SiO_2$ or the like. The catalyst in the as-used condition is also a part of this invention.

The catalytic composition is made by the treatment of the molybdenum or tungsten sulfide base material with a low valent transition metal organometallic composition via direct reaction, if the molybdenum or tungsten sulfide is in the soluble form, or by impregnation in a suitable solvent medium if the molybdenum or tungsten sulfide is in a solid or in a supported form. No calcination of the reacted or impregnated product is necessary or desirable to produce the inventive catalyst.

Organometallic materials which operated to promote molybdenum sulfide in hydroprocessing reactions include any low-valent transition metal organometallic complex which is capable of reaction with the molybdenum or tungsten sulfides (or polysulfides). Examples of the organometallic complex materials include $Co_2(CO)_8$, $Co(NO)(CO)_3$, cobalt cyclopentadienyl dicarbonyl, nickel di (4,5-cyclooctadiene), $Ni(CO)_4$, $((C_2H_5O)_3P)_4Ni$, $C_4H_6Fe(CO)_3$ and $Fe_2(CO)_9$.

Hydroprocessing process is meant to include any process that is carried out in the presence of hydrogen including, but not limited to, hydrocracking, hydrodesulfurization, hydrogenation of aromatic and aliphatic unsaturated hydrocarbons, methanation, water gas shift, etc. The instant catalyst is especially suitable as a hydrodesulfurization catalyst. These reactions include hydrotreating and hydrorefining reactions, the difference generally being thought of as more of a difference in degree than in kind, with hydrotreating conditions being more severe than hydrorefining conditions.

DESCRIPTION OF THE INVENTION

As noted above, this invention deals with bulk or supported molybdenum or tungsten sulfide hydroprocessing catalysts which have been promoted with low valent, transition metal organometallic complexes.

The molybdenum sulfide-containing or tungsten sulfide-containing material which is treated with the low-valence transition-metal-containing organometallic complex may be a solid bulk material having the general formulae $MoS_{2+e}$ or $WS_{2+e}$ where e may have a value between −1 and 1. The initial materials may also be mixtures of $MoS_{2+e}$ and $WS_{2+e}$.

The molybdenum or tungsten-sulfide containing material may also be a soluble molecular complex wherein an ammonium and/or a hydrocarbyl substituted ammonium salt of a molybdenum or tungsten sulfide cluster having an anion of the general formulae $Mo_xS_y^{2-}$ or $W_xS_y^{2-}$, wherein x may be 1, 2, or 3 and y may be 4, 8, 9, 12 or 13 and wherein y is fixed firstly by the value of x and secondly by the number of sulfur-to-sulfur bonds contained in the sulfide cluster or a mixture of such compounds which is treated by the low valence transition metal.

The cations of the $Mo_xS_y^{2-}$ or $W_xS_y^{2-}$ anions may be, as mentioned above, ammonium or hydrocarbyl substituted ammonium salts of the form $R_1R_2R_3R_4N$ wherein $R_1$, $R_2$, $R_3$ and $R_4$ may the same or different positively charged radical selected from hydrogen ($H^+$), $C_1$–$C_{18}$ alkyls, $C_5$–$C_{18}$ cycloalkyls, $C_6$–$C_{18}$ alkyl substituted cycloalkyls, $C_6$–$C_{18}$ aromatics and $C_7$–$C_{18}$ alkyl substituted aromatics.

Generally preferred soluble $MoS_{2+x}$ or $WS_{2+x}$ compounds are tetraalkylammonium thiomolybdate or tetraalkylammonium thiotungstate particularly the tetrabutyl forms of the salts, e.g., $(TBA)_2MoS_4$ or $(TBA)_2WS_4$.

Mixtures of the molybdenum and tungsten sulfide starting materials whether they be bulk or soluble are also contemplated as are one or the other or both as a suitable substrate of the type readily known in this art.

The low valent organometallic complexes may be based on any reactive transition metal. The preferred metals are Fe, Ni or Co and the most preferred is Co. By "low valent" is meant that the metal is in the 0 or +1 valence state. The complex may be monometallic or may contain two or more of the cited transition metals. Although carbonyl complexes are desirable because they are readily available and reactive, other complexes are similarly suitable, e.g., $Co(NO)(CO)_3$, cobalt cyclopentadienyl dicarbonyl (CP), nickel di(1,5-cyclooctadiene), which can be expressed in a shortened form as $(1,5\text{-COD})_2Ni$ $Ni(CO)_4$, $((C_2H_5O)_3P)_4Ni$, $C_4H_6Fe(CO)_3$ and $Fe_2(CO)_9$.

For the purposes of discussing this invention, the material produced by the reaction of the molybdenum or tungsten sulfide with the low valent organometallic complex will be called the "predecessor" or "predecessor catalyst". The predecessor catalyst may be introduced directly into the reaction vessel without additional treatment and brought up to operation "on oil". The predecessor catalyst, as present in the reactor after having been brought up "on oil" will be referred to as the "catalyst". The predecessor catalyst may be treated with hydrogen and hydrogen sulfide either prior to its introduction into the reaction vessel or in-situ within the reaction vessel. The predecessor material so-treated will be referred to as the "sulfided catalyst". Each of the "predecessor catalyst", "sulfided catalyst" and "catalyst" form variations of the present invention.

There are three general methods for producing the catalytic materials of this invention: (1) impregnation of the low-valent transition metal organometallic complex into a catalyst support containing molybdenum and/or tungsten sulfides; (2) direct addition of the organometallic complex to bulk molybdenum and tungsten sulfides; and (3) direct addition of the organometallic complex to a soluble molybdenum and/or tungsten sulfide complex.

The first process involves the treatment of a catalyst support containing molybdenum or/and tungsten sulfide with the noted complexes. Production of supported molybdenum tungsten sulfide is taught generally in U.S. Pat. Nos. 4,431,747 and 4,430,443 to Siever and Chianelli, the entirety of which are incorporated by reference.

The preferred support for the catalyst species of this invention is alumina, and the composite support can contain for example, one or more of alumina, bentonite, clay, diatomaceous earth, zeolite, silica, activated carbon, magnesia, zirconia, boria, titania and the like, these latter with alumina, usually in a range of from about 1 to 20 weight percent, based on the weight of the support. A preferred support for the practice of the present invention is one having a surface area of more than 50 m²/g, preferably from about 100 to about 300 m²/g.

A solution of the organometallic complex is simply contacted with the supported molybdenum or tungsten sulfide, preferably at or near room temperature, (although gentle heating may occasionally be desirable) until the reaction is complete. When using a carbonyl complex, for instance, the reaction is substantially done when the evolution of gaseous CO ceases.

Similarly, when promoting the bulk form of the molybdenum or tungsten sulfide, the organometallic complex solution is simply mixed with the base molybdenum tungsten-sulfide material for a period of time sufficient to complete the reaction.

When promoting a molybdenum or tungsten sulfide substrate which is solubilized as a complex, e.g., $(TBA)_2MoS_4$, the organometallic complex is added in an appropriate amount and the product recovered after precipitation. The suitable Mo/W complexes include those generally specified above.

Calcination is not usually desired lest the hydroconversion activity of the inventive catalyst be curtailed.

As discussed above, molybdenum and tungsten sulfide catalysts (both bulk and supported), have many uses, including hydrotreating. Hydrotreating conditions vary considerably depending on the nature of the hydrocarbon being hydrogenated, the nature of the impurities or contaminants to be reacted or removed, and, inter alia, the extent of conversion desired. In general however, the following are typical conditions for hydrotreating a naphtha boiling within a range of from about 25° C. to about 210° C., a diesel fuel boiling within a range of from about 170° C. to 350° C., a heavy gas oil boiling within a range of from about 325° C. to about 475° C., a lube oil feed boiling within a range of from about 290°–550° C., or residuum containing from about 10 percent to about 50 percent of material boiling above about 575° C.

Finally, the catalysts of this invention are particularly useful for removing sulfur from sulfurcontaining feedstocks whether or not the feedstock additionally contains other contaminants such as nitrogen. Indeed, these materials are exceptionally selective as HDS catalysts.

| Typical Reaction Conditions | | | | |
|---|---|---|---|---|
| Feed | Temp., °C. | Pressure psig | Space Velocity V/V/Hr | Hydrogen Gas Rate SCF/B |
| Naphtha | 100–370 | 150–800 | 0.5–10 | 100–2000 |
| Diesel Fuel | 200–400 | 250–1500 | 0.5–4 | 500–6000 |
| Heavy Gas Oil | 260–430 | 250–2500 | 0.3–2 | 1000–6000 |
| Lube Oil | 200–450 | 100–3000 | 0.2–5 | 100–10,000 |
| Residuum | 340–450 | 1000–5000 | 0.1–1 | 2000–10,000 |

The invention will be more readily understood by reference to the following examples which are not intended to be, in any manner, limiting to the claimed invention.

EXAMPLE 1

A sample of 1.2 g $MoS_3$ (6.25 mmoles) was placed in a 50 ml Schlenk flask in an inert atmosphere chamber, and slurried in 10 ml THF. An amount of 90 mg $Co_2(CO)_8$ (0.263 mmoles) was dissolved in 5 ml THF and added to the $MoS_3$ slurry. Slow evolution of gas (CO) was observed. After 18 hours the solution was colorless, and gas evolution had ceased. The solid was filtered under an inert atmosphere, pressed and sieved to 20–40 mesh. Assuming complete reaction of $Co_2(CO)_8$, the Co/Mo ratio was 0.084.

EXAMPLE 2

The HDS activity of the bulk product (precursor catalyst) produced in Example 1 was tested by the following procedure. The catalyst as produced was placed in an autoclave operating at 3150 kPa and 350° C. The feedstock was a model material comprising 100 cc of 5 wt. % dibenzothiophene ("DBT")/decalin and 100 cc/min of $H_2$. The catalyst was then removed from the reactor, washed with fresh feed and a second run attempted at the same reaction conditions. The conversion during the second run is shown as Run 2.

Approximate first order rate values are compared, in the Table below, with that of a well-known commercial HDS catalyst made up of sulfided CoMo on alumina having an initial composition of 12.5% $MoO_3$ and 3.5% CoO.

TABLE

| Catalyst | Activity ($10^{16}$ × molecules DBT/g Catalyst Sec) |
|---|---|
| Run 1: $MoS_3$ +.1 Co(as $Co_2(CO)_8$) | 170* |
| Run 2: $MoS_3$ +.1 Co(as $Co_2(CO)_8$) | 108* |
| Commercial Catalyst | 65 |

*using only last two hours data

It should be noted that in both runs, the activity increases during the run, and the reported pseudo-first order rate values must be interpreted accordingly. Nevertheless, it is clear that this inventive catalyst exhibits a very high activity particularly when the low Co/Mo ratio (0.1) is taken into account.

EXAMPLE 3

A catalytic material was prepared according to the following procedure: 7.61 g of ammonium pore paramolybdate $(NH_4)_6Mo_7O_{24}$ in 121 g $H_2O$ was impregnated on 76.8 gm of —$Al_2O_3$ using an incipient wetness method. The impregnate was then calcined at 400° C. in air for two hours and then sulfided with a 15% $H_2S$-in-$H_2$ gas mixture at 400° C. for 45 minutes. The thus-sulfided material was then reacted with $Co_2(CO)_8$ at or near room temperature. The reaction was essentially complete when the evolution of gaseous CO ceased. Elemental analyses of the final precursor catalyst, which is designated as Catalyst A, showed the following partial composition: Mo, 4.97 wt. %; Co, 1.94%; Al, 35.38%; C, 0.7%; H, 0.81%.

EXAMPLE 4

The inventive precursor catalyst produced in Example 3 (Catalyst A) was then evaluated on a real feed of light catalytic cycle oil (LCCO). The test was carried out in an automated, continuously stirred tank reactor unit consisting of a one liter autoclave, calibrated feed burette, pump, gas-liquid separator, and product liquid collector. Twenty cc of precursor catalyst (6.32 g) was charged in a stainless steel basket which was placed inside the autoclave. The test conditions were 325° C., 3.15 MPa, 3000 SCF/B$H_2$, and 1.0 LHSV. Stirring rate was set at 1500 rpm to ensure the absence of mass transfer effects. A commercial sulfided $NiO$-$MoO_3/Al_2O_3$ (18% $MoO_3$ and 3.5% NiO) catalyst was evaluated to provide a basis for comparison. The results in terms of volumetric percent heteroatom removal are summarized below.

TABLE 1
Performance of Catalyst A

| Life, Hr | % HDS | % HDN |
|---|---|---|
| 47 | 58.9 | 10 |
| 66 | — | 10.8 |
| 100 | 60.4 | 10.0 |
| 106 | 60.8 | 11.6 |
| 128 | 59.3 | 10 |

TABLE 2
Performance of Commercial Catalyst

| Life, Hr | % HDS | % HDN |
|---|---|---|
| 45 | 58.9 | 38.5 |
| 61 | 62.1 | 38.7 |
| 68 | 60.9 | 40.8 |
| 85 | 60.9 | 42.8 |
| 93 | 60.9 | 42.4 |

As can be seen, the catalyst gives an unusual combination of high HDS and low HDN. This selectivity behavior for HDS can further be quantified by taking the ratio of the HDS reactive rate ($K_{HDS}$) to the HDN reaction rate constant ($K_{HDN}$), based on one-half and 1.5th order kinetics, respectively.

Table 3 shows the comparison of HDS selectivity between the two catalysts.

TABLE 3
Comparison of HDS Selectivity

| Catalyst | $K_{HDS}$ | $K_{HDN}$ | $S_{HDS}$ |
|---|---|---|---|
| A | 2.0 | 10.8 | 0.19 |
| Commercial | 2.0 | 42.6 | 0.05 |

The high HDS selectivity of the experimental catalyst suggests that it may be used to advantage if it is used in combination with an HDN-selective catalyst in a composite bed or a two-stage reactor system. A process of this type would provide greater control over hydrogen utilization and allow each of the two selective catalysts to be individually optimized for different quality feeds.

Having described the invention and provided examples of its operation, it should be apparent that various modifications and changes can be made to the invention as claimed below without departing from the spirit of the invention.

We claim as our invention:

1. A hydroconversion predecessor catalyst comprising at least one of molybdenum or tungsten sulfide promoted by reaction of said molybdenum or tungsten sulfide with transition metal containing organometallic complex wherein the valence of metal is 0 or +1 at said reaction.

2. The catalyst of claim 1 wherein said organo metallic complex contains a metal selected from the group consisting of Ni, Co and Fe.

3. The catalyst of either of claims 1 or 2 wherein the molybdenum or tungsten sulfide is $MoS_{2+e}$ or $WS_{2+e}$ where e is between −1 and +1.

4. The catalyst of claim 3 wherein the $MoS_{2+e}$ or $WS_{2+e}$ is supported.

5. The catalyst of claim 4 wherein the support comprises alumina.

6. The catalyst of claim 5 wherein the support additionally contains 1 to 20 weight percent of bentonite clay, diatomaceous earth, zeolite, silica, activated carbon, magnesia, silica, zirconia, boria or titania.

7. The catalyst of claim 1 wherein said organometallic complex is selected from $Co_2(CO)_8$, $Co(NO)(CO)_3$, $CpCo(CO)_2$, $(1,5\text{-}COD)_2Ni$, $Ni(CO)_4$, $((C_2H_5O)_3P)_4Ni$, $C_4H_6Fe(CO)_3$ and $Fe_2(CO)_9$.

8. A sulfided hydroconversion catalyst comprising at least one of molybdenum and tungsten sulfide promoted by reaction of said molybdenum and tungsten sulfide with a transition metal organometallic complex wherein the valence of metal is 0 or +1, said reaction followed by treating the promoted sulfide with $H_2$ and $H_2S$.

9. The catalyst of claim 8 wherein said organo metallic complex contains a metal selected from the group consisting of Ni, Co and Fe.

10. The catalyst of either of claims 8 or 9 where the molybdenum or tungsten sulfide is $MoS_{2+e}$ or $WS_{2+e}$ respectively, and wherein e is between −1 and +1.

11. The catalyst of claim 10 wherein the $MoS_{2+e}$ or $WS_{2+e}$ is supported.

12. The catalyst of claim 11 wherein the support comprises alumina.

13. The catalyst of claim 12 wherein the support additionally contains 1 to 20 weight percent of bentonite clay, diatomaceous earth, zeolite, silica, activated carbon, magnesia, silica, zirconia, boria or titania.

14. The catalyst of claim 8 wherein said organometallic complex is selected from $Co_2(CO)_8$, $Co(NO)(CO)_3$, $CpCo(CO)_2$, $(1,5\text{-}COD)_2Ni$, $Ni(CO)_4$, $((C_2H_5O)_3P)_4Ni$, $C_4H_6Fe(CO)_3$ and $Fe_2(CO)_9$.

15. A hydroconversion catalyst comprising at least one of molybdenum or tungsten sulfide promoted by reaction of said molybdenum or tunsten sulfide with a transition metal organometallic complex wherein the valence of metal is 0 or +1 at said reaction and reducing the promoted sulfide in the presence of a hydrocarbon.

16. The catalyst of claim 15 wherein said organo metallic complex contains a metal selected from the group consisting of Ni, Co and Fe.

17. The catalyst of either of claims 15 or 16 wherein the molybdenum or tungsten sulfide is in the form of $MoS_{2+e}$ or $WS_{2+e}$ wherein e is between −1 and =1.

18. The catalyst of claim 17 wherein the $MoS_{2 \cdot e}$ or $WS_{2+e}$ is supported.

19. The catalyst of claim 18 wherein the support comprises alumina.

20. The catalyst of claim 19 wherein the support additionally contains 1 to 20 weight percent of bentonite clay, diatomaceous earth, zeolite, silica, activated carbon, magnesia, silica, zirconia, boria or titania.

21. The catalyst of claim 15 wherein said organometallic complex is selected from $Co_2(CO)_8$, $Co(NO)(CO)_3$, $CpCo(CO)_2$, $(1,5\text{-}COD)_2Ni$, $Ni(CO)_4$, $((C_2H_5O)_3P)_4Ni$, $C_4H_6Fe(CO)_3$ and $Fe_2(CO)_9$.

22. A process for preparing a catalyst comprising a sulfide of a metal selected from the group consisting of molybdenum, tungsten or mixture thereof which is promoted with a transition metal, said process comprising forming a solution of a complex of a sulfide of molybdenum, tungsten or mixture thereof to which is added one or more organometallic complex compounds containing at least one transition metal wherein the valence of said transition metal is 0 or 1 to form a precipitate containing a sulfide of molybdenum, tungsten or mixture thereof and said transition metal.

23. The process of claim 22 wherein said transition metal is selected from the group consisting of Fe, Co, Ni or mixture thereof.

24. The process of either of claims 22 or 23 wherein said complex in said solution of said sulfide of molybdenum, tungsten or mixture thereof is an ammonium or a hydrocarbyl substituted ammonium salt of a molybdenum or tungsten sulfide cluster having an anion of the formula $Mo_xS_y{}^{2-}$ or $W_xS_y{}^{2-}$ where x is 1, 2, or 3 and y is 4, 8, 9, 12 or 13 and having a cation selected of the form $R_1, R_2, R_3, R_4N$ where $R_1, R_2, R_3$ and $R_4$ are the same or different and selected from hydrogen, $C_1-C_{10}$ alkyls, $C_8-C_{18}$ cycloalkyl, $C_6-C_{18}$ alkyl substituted cycloalkyls, $C_6-C_{18}$ aromatics and $C_7-C_{11}$ alkyl substituted aromatics.

25. The process of claim 24 wherein said organometallic complex is selected from the group consisting of $Co_2(CO)_8$, $Co(NO)(CO)_3$, $CpCo(CO)_2$, $(1,5-COD)_2Ni$, $Ni(CO)_4$, $((C_2H_5)_3P)_4Ni$, $C_4H_6Fe(CO)_3$ and $Fe_2(CO)_9$.

26. The process of either of claims 22 or 23 wherein said transition metal promoted molybdenum or tungsten sulfide is supported.

27. The process of claim 24 wherein said transition metal sulfide is supported.

28. The process of claim 25 wherein said transition metal sulfide is promoted.

29. The process of claim 28 wherein said support comprises alumina.

* * * * *